US012726885B2

(12) United States Patent
Milheiro Mendes

(10) Patent No.: US 12,726,885 B2
(45) Date of Patent: Sep. 1, 2026

(54) SERVICE DEPLOYMENT DEVICE, SERVICE EXECUTION DEVICE, AND AD-HOC NETWORK

(71) Applicant: Airbus SAS, Blagnac (FR)

(72) Inventor: Paulo-Jorge Milheiro Mendes, Blagnac (FR)

(73) Assignee: Airbus SAS, Blagnac (FR)

(*) Notice: Subject to any disclaimer, the term of this patent is extended or adjusted under 35 U.S.C. 154(b) by 0 days.

(21) Appl. No.: 18/626,554

(22) Filed: Apr. 4, 2024

(65) Prior Publication Data

US 2024/0340773 A1 Oct. 10, 2024

(30) Foreign Application Priority Data

Apr. 6, 2023 (EP) .................................... 23167180

(51) Int. Cl.

*H04W 48/14* (2009.01)
*H04W 40/24* (2009.01)
*H04W 48/16* (2009.01)
*H04W 84/18* (2009.01)

(52) U.S. Cl.

CPC ......... *H04W 48/14* (2013.01); *H04W 40/246* (2013.01); *H04W 48/16* (2013.01); *H04W 84/18* (2013.01)

(58) Field of Classification Search

CPC ... H04W 48/14; H04W 40/246; H04W 48/16; H04W 84/18; H04W 16/18; H04W 24/08; H04L 41/0895; H04L 41/5054; H04L 41/0806; H04L 41/12

See application file for complete search history.

(56) References Cited

U.S. PATENT DOCUMENTS

2009/0092105 A1* 4/2009 Chou ...................... H04L 47/70 370/337
2014/0092765 A1* 4/2014 Agarwal ............... H04W 24/02 370/252
2019/0349429 A1* 11/2019 Jain ....................... G06F 16/182
2020/0112497 A1* 4/2020 Yenumulapalli ........ H04L 43/10

(Continued)

OTHER PUBLICATIONS

European Search Report for corresponding European Patent Application No. 23167180.1 dated Oct. 4, 2023.

*Primary Examiner* — Hashim S Bhatti
*Assistant Examiner* — Sriharsha Reddy Vangapaty
(74) *Attorney, Agent, or Firm* — Greer, Burns & Crain, Ltd.

(57) ABSTRACT

A service deployment device and a service execution device. The service deployment device creates and deploys services composed of multiple microservices in an ad-hoc network. The service execution device provides a service to a data consumer. The service deployment device uses a predetermined service map to generate a service tree and deploy the microservices of a service to network devices of the ad-hoc network. The service tree is transmitted to a service execution device when a service is requested, so that the service execution device is able to retrieve the service defined by the service tree and provide the service to a service consumer. The service deployment device and the service execution device may be implemented in an ad-hoc network that includes at least some mobile network devices that are located on a vehicle, like an aircraft, watercraft, spacecraft, and terrestrial vehicle.

10 Claims, 5 Drawing Sheets

(56) References Cited

U.S. PATENT DOCUMENTS

| | | | | |
|---|---|---|---|---|
| 2021/0191706 | A1* | 6/2021 | Sn | G06F 11/3466 |
| 2021/0243247 | A1* | 8/2021 | He | H04L 41/5054 |
| 2022/0201638 | A1* | 6/2022 | Arrobo Vidal | H04W 48/08 |
| 2022/0225065 | A1* | 7/2022 | Doken | H04L 41/5051 |

* cited by examiner

SERVICE DEPLOYMENT DEVICE, SERVICE EXECUTION DEVICE, AND AD-HOC NETWORK

CROSS-REFERENCES TO RELATED APPLICATIONS

This application claims the benefit of the European patent application No. 23167180.1 filed on Apr. 6, 2023, the entire disclosures of which are incorporated herein by way of reference.

FIELD OF THE INVENTION

The invention relates to the field of data networks, and particularly to a service deployment device for deploying services composed of multiple microservices in an ad-hoc data network. Furthermore, the invention relates to a service execution device for executing services that are composed of multiple microservices. The invention further relates to an ad-hoc network with multiple network devices and a service deployment device and/or a service execution device as mentioned above.

BACKGROUND OF THE INVENTION

Data networks are generally used to transmit data between data producers and data consumers and to provide services to service consumers. Data networks typically have a topology that is known a priori. Based on the known topology of the data network, data packets are routed from one end device via one or more routers to another end device. Furthermore, resources in the network may be used to provide computational power and/or other services to service consumers. For example, services may be hosted on network devices of the data network and offer processing power to service consumers. For this purpose, the services are typically hosted on so-called edge-devices that are close to the service consumer to avoid delay resulting from latency of data transmission.

However, in large scale networks and networks with dynamically changing topology (e.g., networks that include network devices located on moving vehicles, like computing devices on aircraft or other vehicles), providing services by the network to a service consumer may be a challenging task.

Wireless dynamic networks, such as a mobile ad-hoc network (MANET) or a delay-tolerant network (DTN) encompass mobile hosts that can communicate with each other using wireless links. In such environments, deployment of services in the network or on the network devices may require reassessment after a certain time to avoid breakdown of service performance and increased latency.

SUMMARY OF THE INVENTION

It may be seen as an object to effectively deploy and execute a service composed of multiple microservices in an ad-hoc network with a topology that changes over time.

A deployment device for deploying a service composed of multiple microservices in an ad-hoc network with multiple devices which are communicatively connected to one another is provided. The deployment device comprises a controller. The controller is configured to monitor a status of the ad-hoc network by collecting: a topology of the ad-hoc network, current resources of the devices of the ad-hoc network, dynamic behavior of the ad-hoc network, a data transmission delay between a data source and microservices that need data from the data source, and a correlation between the microservices that compose a service; create a service tree based on a service map and the status of the ad-hoc network, wherein the service tree defines a service that is composed of multiple microservices, and wherein the service tree includes an assignment of each of the multiple microservices of a service to a service device of the ad-hoc network; create an entry in a source routing table to transmit one of the multiple microservices to the assigned service device; generate a deploy packet for each of the multiple microservices, wherein each deploy packet carries a respective microservice in a payload of the deploy packet and a source routing chain indicating the routing chain of the deploy packet to the assigned service device in a header of the deploy packet; and deploy the deploy packet in the ad-hoc network.

In one embodiment, the controller is configured to periodically repeat the monitoring of the status of the ad-hoc network.

In another embodiment, the controller is configured to monitor the status of edge devices and/or mobile devices of the ad-hoc network.

In another embodiment, the controller is configured to monitor the status of the ad-hoc network by using an Information Centric Networking data plane by periodically sending an interest packet via an interface connecting the deployment device to the ad-hoc network.

In another embodiment, the controller is configured to receive a service request that indicates a service to be deployed; fetch a service map based on the received service request; create the service tree based on the fetched service map and at least one of the following: an execution time of the service, an execution time of each microservice of the service, a transmission delay between service devices of the ad-hoc network for executing the microservices of the service, resources like storage, computing capacity, and/or energy capacity of each service device of the ad-hoc network, distance between service devices and data sources.

For example, the ad-hoc network comprises multiple service devices which execute or run the microservices. The controller considers the transmission delay between the service devices of the ad-hoc network when creating the service tree so that interdependent microservices are deployed to service devices with a low transmission delay in between. The distance between the data sources and the service devices relates to the data link lengths, transmission time, or hops in the network between the data sources and the service devices. It may be preferred to keep this distance short, i.e., the data sources are as close as possible to the service devices that execute an operation (a microservice) based on the data from the data sources.

A service device for executing a microservice in an ad-hoc network is provided. The service device is configured to receive a service request from an end device; look up for an availability of the requested service and, when the requested service is available, provide the requested service to the end device, and, when the requested service is not available, request a service to be deployed by a deployment device and execute the service.

The end device may be a data consumer that sends a request for a service to the service device.

In one embodiment, the service device is configured to identify a service head of the requested service and look up for the requested service locally.

In this case, the service device verifies if it hosts the requested service itself, i.e., locally.

In another embodiment, the service device is configured to forward the service request to neighboring service devices when the requested service is not found locally.

In another embodiment, the service device is configured to create an interest packet for requesting a service to be deployed and to forward the interest packet to a deployment device and to receive a data packet with a service tree defining the requested service.

In another embodiment, the service device is configured to execute the service by executing multiple microservices that compose the service in accordance with a service tree.

The microservices may be located on the service device or on another network device. Each microservice may be hosted by another network device such that the microservices are hosted by physically distinct network devices. One network device may host one or more microservices. However, not every network device necessarily hosts a microservice of a given service.

In another embodiment, the service device is configured to execute the service by coordinating a chain of interest/data packet transmissions.

An ad-hoc network is provided. The ad-hoc network comprises multiple network devices that are communicatively connected to one another in accordance with a network topology, a deployment device as described above and hereinafter, and a service device as described above and hereinafter. Each of the multiple network devices is configured to execute at least one microservice that belongs to a service to be provided to service consumers.

In one embodiment, each of the multiple network devices is a network node that establishes the network topology of the ad-hoc network.

In another embodiment, each of the multiple network devices is located on a stationary entity or on a mobile entity, wherein the multiple network devices are interconnected by direct links between two network devices, respectively.

In other words, the network devices are located on multiple physical entities that are distinct from one another, i.e., they are different physical entities. The network devices may be located on a ground device or on mobile vehicles (watercraft, aircraft, spacecraft, terrestrial vehicles) that are interconnected by an ad-hoc or mesh network.

BRIEF DESCRIPTION OF THE DRAWINGS

The subject matter will hereinafter be described in conjunction with the following drawing figures, wherein like numerals denote like elements, and wherein.

DETAILED DESCRIPTION OF THE PREFERRED EMBODIMENTS

Figure 1:
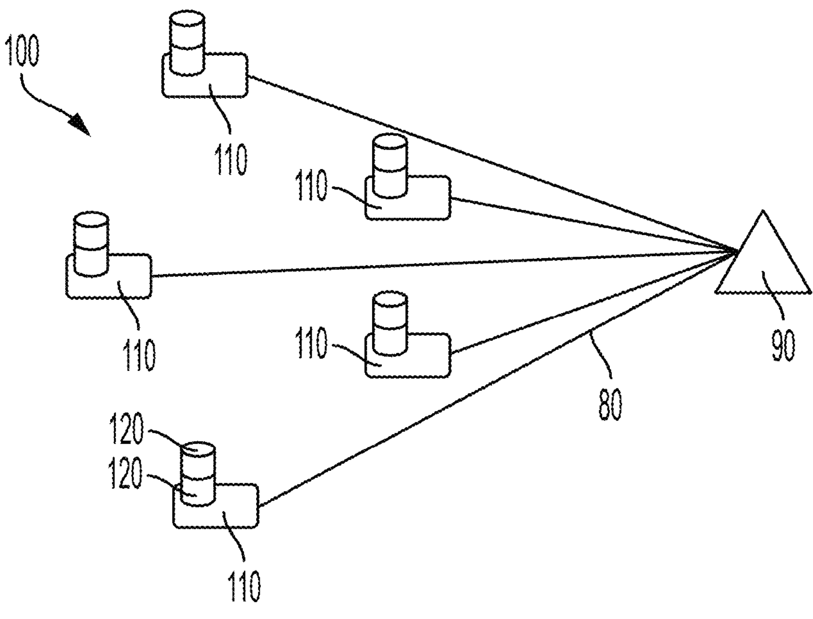
FIG. 1 is a schematic representation of a network with multiple network devices.

The following detailed description is merely exemplary in nature and is not intended to limit the invention and uses of the invention. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

The increased usage of mobile data services is having a significant impact on the architecture of networks that provide services to consumers. The development of latency-critical services, such as video stream analysis and augmented reality, requires extensive real-time computing. In this context, Mobile Edge Computing (MEC) provides computing services at the network edge (e.g., cellular base stations), aiming to improve the performance required by latency-critical services. However, existing MEC-approaches may rely on a set of predefined edge devices used to deploy monolithic services. Moreover, service deployment does not change according to the needs of different services and dynamic environmental setups. Being deployed at the edge of a mobile network, services may fail to provide the required quality when the edge device is too far away from the service consumers.

The approach described herein is related to the deployment of services on an ad-hoc cloud of computational devices, based on Software Defined Networking (SDN), Information Centric Networking (ICN) and Microservice approaches. An ad-hoc cloud is made of a set of devices that are interconnected with each other, but that may belong to different physical entities, and may have independent behavior (e.g., movement). The computational devices can still be edge computing devices collocated with cellular base stations or with satellite ground stations but can also be clusters of mobile devices such as terrestrial vehicles, drones, aircrafts, and satellites, which are interconnected by an ad-hoc or mesh wireless (radio or optic) network. The approach described herein can also be applied to hybrid scenarios encompassing edge devices as well as ad-hoc devices.

Exemplary topologies of ad-hoc networks are shown in FIGS. 1 to 4 and will be described in greater detail further below.

According to the approach described herein, services are not deployed as a monolithic element in a single computational device. The present approach describes a distributed deployment scheme, in which services are defined by a set of correlated microservices, each of which can be deployed and executed in a different computational device, based on an information centric networking data plane.

Generally, the concept of cloud computing provides an on-demand availability of computer system resources, especially data storage and computing power, without direct active management by the user, i.e., the service consumer.

The cloud allows users to access solutions for computing, connectivity, and storage cost-effectively and easily. However, the cloud is a centralized resource. In this context, data centers refer to the actual stationary data collection facility, run by the same entity, where all the data storage, data distribution and calculation happens.

Generally, edge computing aims to reduce the latency of cloud services by being a distributed computing paradigm that brings computation and data storage closer to the location where it is needed, aiming to improve response times and save bandwidth. In the context of a network, edge devices are the leaf nodes for information collection, also sometimes referred as 'edge nodes'.

Processing services in edge nodes and not in the cloud brings some advantages such as: i) relieve the limitations coming from network bandwidth and reduce the data center energy consumption; ii) by processing data in a node that is close to edges, rather than in the data center directly, the network delay will be shortened based on closer communication distance; iii) private data does not need to be uploaded to data centers directly, rather stay in edge or intermediate nodes.

Current edge computing frameworks, such as the Multi-access Edge Computing (MEC) may focus on the relationship between edge and cloud to achieve lower delay and higher bandwidth. However, it does not look at scenarios in which different edges may cooperate between themselves, as well as with computational devices located in the far edge, within mobile devices such as vehicles, drones, aircrafts, and satellites. Such a cooperation may solve some of the limitations of edge computing, such as the fact that many edge computing devices discard data after collection, data that may be relevant to other services. Moreover, in a more ubiquitous scenario in which high bandwidth connectivity between mobile devices and edges may not be available (e.g., due to the short range of mm waves used in wireless signal transmission in modern mobile networking like 5G), the latter may still be too far away from the service consumer to be able to support the required low delay. Last but not least, some consumers may not like to export their data to edges, as they do not like to have it in the cloud. In this case, computation over that data must be done in the (personal) device storing the data.

Other approaches, like the so-called fog computing, also involve bringing computing to the edge of the network. The idea is to do as much processing as possible using computing units co-located with the data-generating devices, so that processed data rather than raw data is forwarded, and bandwidth requirements are reduced. However, in some situations, the devices generating data do not have enough resources to run extra computational services.

Hence, there is the need to develop a process able to distribute the several computational functions of a service among a set of devices, which may change over time (ad-hoc cloud) by considering: i) the correlation between data sources and computational functions that need them; ii) the correlation between computational functions, which are normally interdependent.

The approach described herein supports a new concept of ad-hoc cloud, in which computational tasks are distributed among a set of interconnected devices that may belong to different entities and may have independent behavior (e.g., movement). Computational devices can be edge devices of a ground network, or they can also be a cluster of mobile devices such as terrestrial vehicles, drones, aircrafts, and satellites, which are interconnected by an ad-hoc or mesh wireless (radio or optic) network.

FIG. 1 illustrates a network 100 implementing a traditional edge computing scenario, in which a set of devices 110, which may be edge devices, directly cooperate individually with a cloud system 90, which is able to delegate some computational monolithic services 120 to each of the devices 110 placed at the edge of the network 100.

Figure 2:
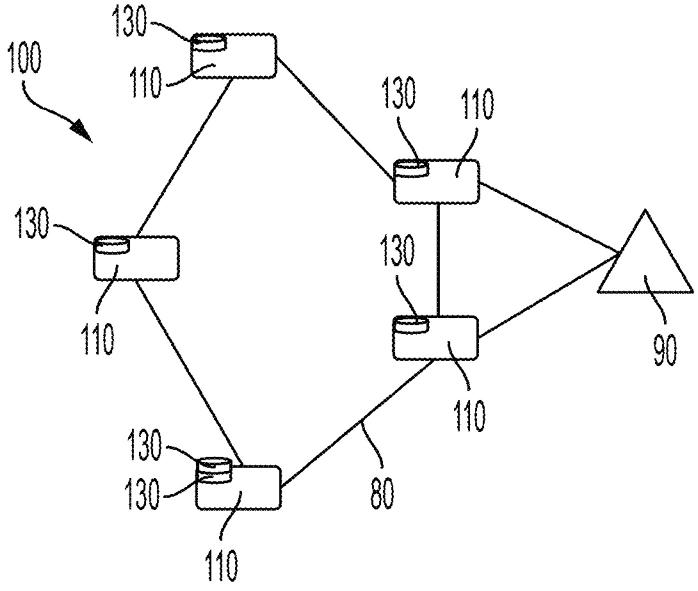
FIG. 2 is a schematic representation of an ad-hoc network with microservices deployed throughout the network devices.
Figure 3:
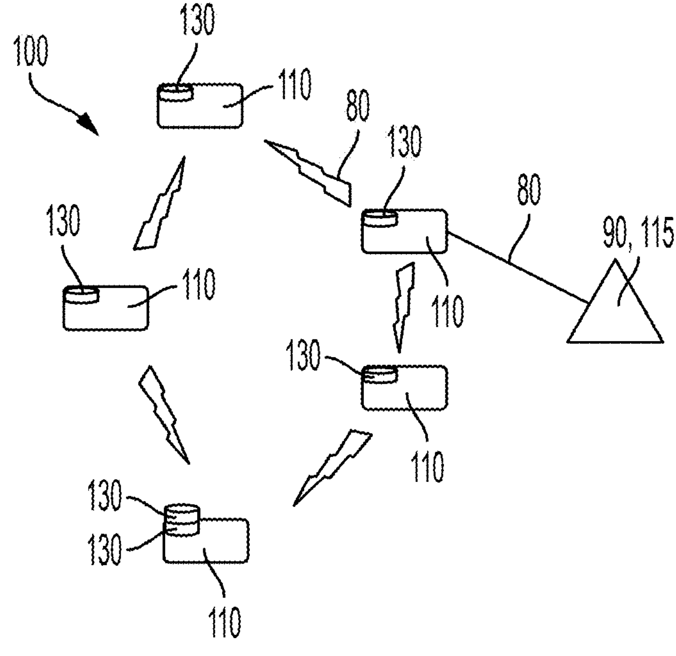
FIG. 3 is a schematic representation of an ad-hoc network with microservices deployed throughout the network devices.
Figure 4:
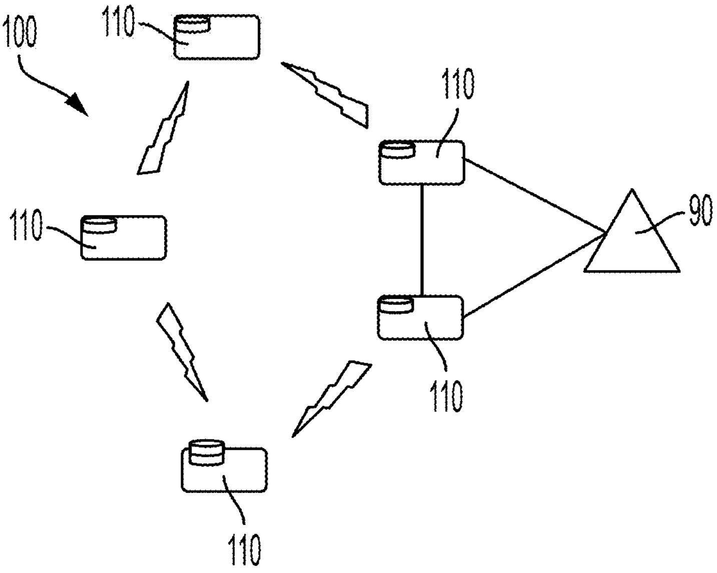
FIG. 4 is a schematic representation of an ad-hoc network with microservices deployed throughout the network devices.

FIGS. 2 to 4 show different scenarios of a network 100 that represent ad-hoc clouds in which resources may be intermittently available. In this case, services are built up based on microservices 130 that encompass different computational functions. The microservices 130 can be executed in a different device 110, wherein the device 110 may be an edge device and/or a mobile device.

FIG. 2 shows a network 100 with a cloud system 90. Multiple devices 110 are interconnected with each other by communication links 80 in accordance with a network topology. At least some or all devices 110 implement and execute a microservice 130. The microservices 130, when executed in a certain order and cooperating with each other, contribute to providing a service to a service consumer (not shown).

FIG. 3 shows a network 100 similar to the network 100 of FIG. 2, with minor modifications. The devices 110 are interconnected with each other by wireless radio links 80. One of the devices 100 is connected to the cloud 90 or to an edge device 115. In other words, the devices 110 are interconnected with each other according to a network topology and one of the devices 110 establishes a communication link (in this example, the link to the cloud 90 is a wired link and the other links are wireless links) to the cloud 90 or to another edge device 115.

FIG. 4 shows a network 100 in which two devices 110 are connected to the cloud 90 with the remaining devices 110 being interconnected with each other and implementing microservices, as described with reference to FIGS. 2 and 3.

In the context of this description, ad-hoc cloud services are defined by a map of correlated microservices and are deployed and executed on-demand on several devices 100 based on a Software Defined Networking (SDN) approach and an Information Centric Networking (ICN) data plane. The SDN controller, installed in the cloud or in another device 110, as shown in FIGS. 2 to 4, decides for each microservice to which network device 110 to deploy. The ICN based data plane ensures the interconnectivity between all the deployed microservices 130 while the physical location or network location of each device 110 is irrelevant. The ICN based data plane allows fast retrieval of data based on an in-network caching system.

The deployment of the microservices of a specific service is done taking into account: i) the current capability of the different devices of the ad-hoc network; ii) the dynamic behavior of the network; iii) the delay between data sources and the microservices that need them; iv) the correlation between the different microservices (the output of one microservice may be the input of another microservice) in order to reduce the overall service delay.

The approach as described herein shows how services, defined as maps of microservices, can be deployed and executed in an ad-hoc cloud, based on an Information Centric Networking (ICN) framework. The concept of ICN brings advantages to connect the different microservices used to support the execution of services in a distributed manner within an ad-hoc network. ICN allows the development of host-independent networking frameworks, which are more suitable for highly dynamic networks, as is the case of ad-hoc networks, due to the intermittent availability of resources. This means that in an ICN based service deployment and execution framework, end-users may directly request the network (e.g., nearest network device that is located on a vehicle or satellite) to execute a specific service without the need of previously discovering the location of all needed microservices, making the execution of services more resilient to the dynamics of the network.

The approach as described herein is particularly beneficial when used in a network with dynamically changing topology, for example when the network is made up of one or more network nodes (devices) that are located aboard mobile vehicles and change their geographic position as well as their location in the network. Changing the location in the network means that a network device changes its connections to neighboring devices over time.

In comparison with other approaches that aim to support the usage of services, created as chains of microservices, based on an information centric networking approach, the approach as described herein has the following benefits: installation of all microservices of all envisioned services within edge and/or mobile devices is not required in advance; rather, this approach supports the on-demand deployment and execution of services; services defined as maps of microservices are supported, allowing the execution of services in networks with constraint resources; representation of microservices is not restricted; a service deployment framework based on SDN is used, allowing the simplification of the implementation of the edge and mobile devices; a service execution framework based on ICN is used, ensuring a better adaptation to dynamic networks.

In the information centric networking (ICN) paradigm, locating a piece of information or a data object in a network and routing a request to retrieve such data object from the best location are closely related. Generally, two major strategies can be applied to this purpose: a full name-based approach in which the routing operates only based on names, or a hybrid approach in which routing works based on locators like IP addresses or geo-location identifiers which are retrieved from the data name by a resolution scheme.

In an ICN framework, an information object (or, generally speaking, a data object) has a unique name and can be stored or cached at multiple locations in the network. The name is independent of topological locators, such as host addresses, and is used to discover and retrieve an information object from the best location.

In the ICN paradigm, messages between routers and name resolvers or between producers and consumers are exchanged based on two message types: an interest message and a data message.

The remainder of this description provides more details of the proposed Named Service Networking (NSN) approach for ad-hoc networks, namely the service definition, architectural building blocks, as well as the operations needed to handle the deployment of services.

After having described some fundamental aspects of an ad-hoc network in FIGS. 1 to 4, the microservice ad-hoc network architecture is now described with reference to FIGS. 5 to 7.

Figure 5:
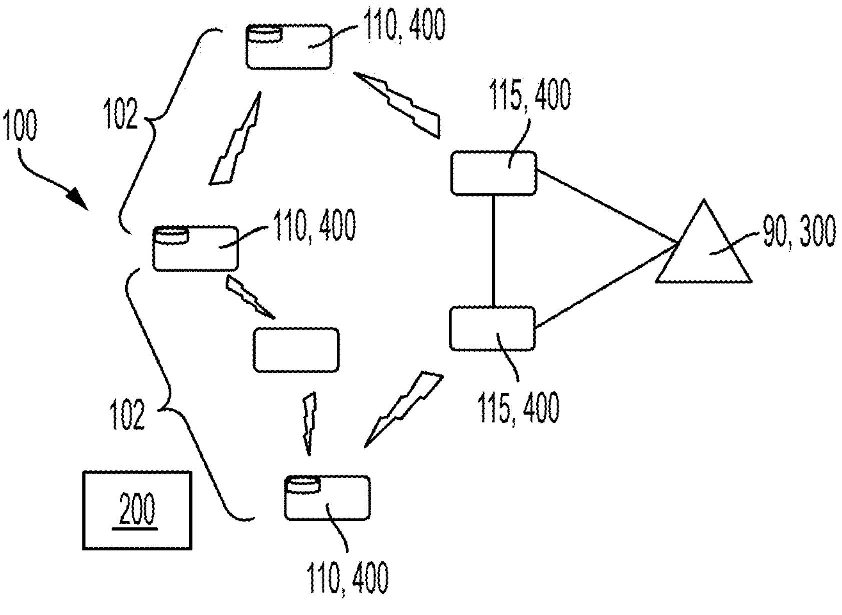
FIG. 5 is a schematic representation of an ad-hoc network with microservices deployed throughout the network devices.
Figure 6:
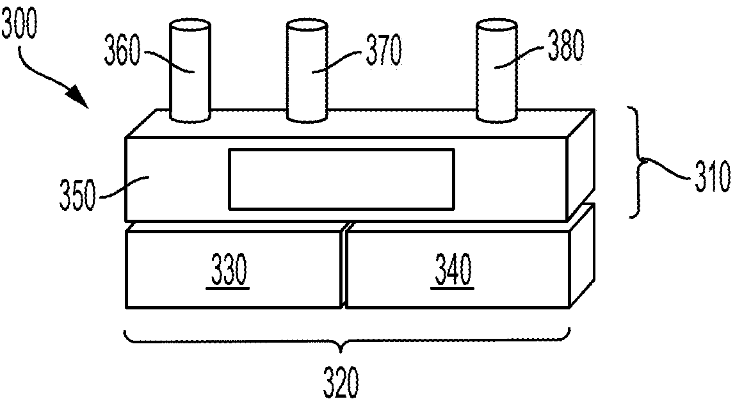
FIG. 6 is a schematic representation of a deployment device.
Figure 7:
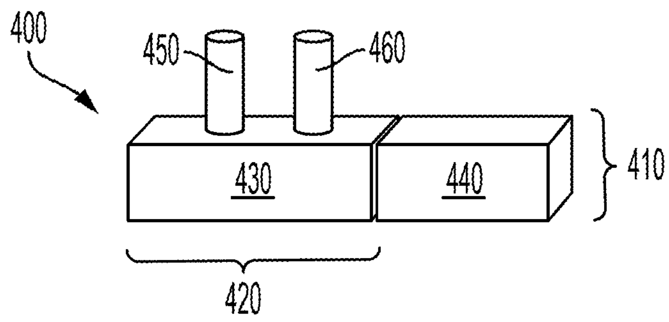
FIG. 7 is a schematic representation of a service device.

As illustrated in FIGS. 5 to 7, independently of the use case, the operation of an ad-hoc network in accordance with the principles described herein is based on the following two types of devices, which may also be referred to as networking agents: a deployment device 300, also called service deployment device or deployment agent, and a service device 400, also called service execution device or service agent. The deployment device 300 is installed in the cloud 90 (e.g., in a data center) or collocated with an edge device (e.g., in a satellite ground station or cellular base station), depending on the networking scenario shown in FIGS. 2 to 4. The service device 300 is installed in all devices 115, 110, be it an edge device 115 or a mobile device 110 that encompass the ad-hoc network 100, as shown in the scenarios illustrated in FIGS. 2 to 4.

An end device 200 is connected to a mobile device 110 and is configured to request a service to be executed by the network 100. For example, the end device 200 is located aboard an aircraft and is wirelessly connected to an access point within the aircraft so that the end device 200 can access services provided by the network device 110 to the passengers and/or end devices within the aircraft. For administrative purposes, the network 100 may be segmented into multiple service segments 102.

FIG. 6 shows an illustration of the major building blocks of the deployment device 300 and FIG. 7 shows the major building blocks of a service device 400. As shown, the overall architecture follows a Software Defined Networking approach, in which the deployment device 300 is responsible for the management of services inside the ad-hoc network, including the deployment and configuration of microservices inside the service devices 400.

The deployment device 300 and/or the service device 400 may be implemented as a software module and be executed by a computing device that is also part of the network 100. In particular, the deployment device 300 and/or the service device 400 executed by one of the existing network devices, like a network node or an edge node.

As shown in FIG. 6, the deployment device 300 has a producer interface 310 and a network interface 320. Furthermore, the deployment device 300 includes the following functional modules: a controller 350, a source based routing module 330, and an information centric networking module 340. The controller 350 receives status data 360 about the status of the network 100 and also receives one or more service maps 380. The controller 350 generates service trees 370.

As shown in FIG. 7, the service device 400 has a consumer interface 410 and a network interface 420. Furthermore, the service device 400 includes a named service networking module 430 and an ICN/IP proxy module 440. The named service networking module 430 accesses a data store 450 and a microservice repository 460.

The communication between the deployment device 300 and the service device 400 makes use of two different approaches: ICN to monitor the network status and react to new service requests, and a source based forwarding approach to install microservices in different service devices.

The service devices rely on a Named Service Networking (NSN) protocol stack that combines the ICN pull based communication model with a segmented based end-to-end communication approach, in which the execution of a service may require the communication over different network segments 102.

The communication between service customers (for example, a service consumer on the end device 200) in the ad-hoc network is done via any service device via the usage of an ICN/IP proxy 440 as shown in FIG. 7.

Figure 8:
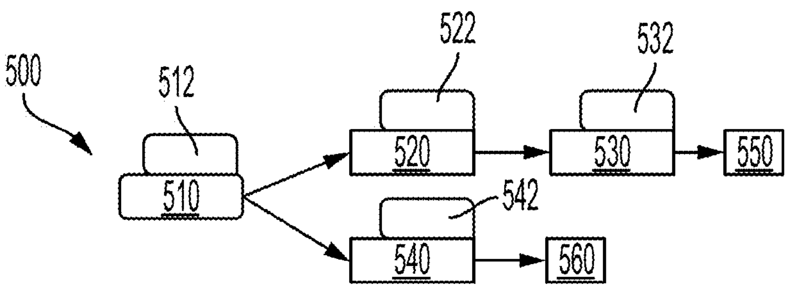
FIG. 8 is a schematic representation of a service map.
Figure 9:
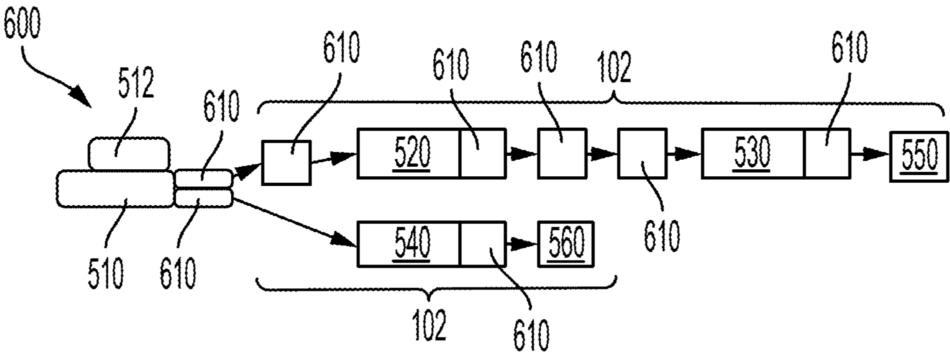
FIG. 9 is a schematic representation of a service tree generated based on the service map of FIG. 8.

FIGS. 8 and 9 describe the named services approach as used in the context of the network 100.

Services are defined as a set of microservices 520, 530, 540 which are intertwined in a specific order, defined by a service map 500, as illustrated in FIG. 8. As shown in this figure, each microservice 520, 530, 540 has a dependency towards other microservices, which provide the input that it needs: such input needs to be provided within the time frame 522, 532, 542 defined for the respective microservice 520, 530, 540. Service producers use service maps 500 to register services near the deployment device. Customers/consumers do not need to be aware of service maps. They request the execution of a service near the closest service device, by indicating only the service head 510, which also has a time frame or an execution time 512 for the entire service.

During execution, the microservices may access data sources to retrieve data needed for execution of the microservices. In the example of FIG. 8, the microservice 530 accesses data source 550 and the microservice 540 accesses data source 560. The microservice 530 processes the data retrieved from the data source 550 and provides the processed data to the microservice 520 which executes additional processing steps based on the processed data received from the microservice 530. The microservice 540 processes the data retrieved from the data source 560. The microservices 520, 540 are linked to the service head 510. The service according to the service map 500 interconnects the processed data from the microservices 520, 540 to output resulting data to the service requestor.

The deployment device 300 uses the service map 500 and the information retrieved in the network monitoring phase to define a service tree 600, which can encompass several service segments 102, as illustrated in FIG. 9. The service tree 600, encompassing the code of all needed microservices 520, 530, 540, is transmitted to a requesting service device 400, during the service retrieval phase, which will be described in greater detail below.

FIG. 9 shows a service tree 600 generated based on the service map 500 of FIG. 8. The service tree starts with the service head 510 and the assigned timeframe 512. Two faces 610 are linked to the service head 510 and each of these faces is the link to one of the segments 102. One of these segments 102 comprises the microservices 520, 530 and the data source 550. The microservices 520, 530 and the data source 550 are linked to each other by one or more faces 610 which link the microservices 520, 530 and the data source 550 to each other. The second segment 102 comprises the microservice 540 and the data source 560. The microservice 540 is linked to the service head 510 via a face 610 and the data source 560 is also linked to the microservice 540 by a respective face 610.

Since all communication inside the ad-hoc network is based on ICN, service segments 102 are identified by hierarchical names. Following is an example of a name structure for a specific multimedia service requiring video gathering, filtering, analysis; sound gathering and analysis; fusion of video and sound:

/multimedia/20 ms/S11/face1/face10/videoanalysis/face30/face40/face50/videofilte ring/face60/video-aircraft320/S12/face2/soundanalysis/face10/surrounding-sound-factory This example shows a service name that encompasses two different network segments (S11 and S12). Each segment may encompass several microservices, as is the case of video analysis and video filtering in the S11 segment, as well as regular ICN data retrieval: /face60/video-aircraft320 and/face 10/surroundingsound-factory.

The operations and individual tasks or functions needed to handle a Named Service Networking approach for ad-hoc networks are the following ones:

1. gathering information about the network topology, especially about edge and mobile devices
2. building service trees
3. deploying a service in an ad-hoc cloud
4. looking up for a service requested by a neighbor customer
5. requesting/retrieving a new service from the deployment device
6. executing a deployed service The tasks or functions 1 to 3 are executed by the deployment device 300 while the tasks or functions 4 to 6 are executed by the service device 400.

Task 1: Network Monitoring

This task allows the controller 350 of the deployment device to periodically gather information about the status of the network 100 including the status of all available edge devices 115 and mobile devices 110.

This task is implemented by using the ICN data plane based on the name/adhoc-cloud/get-status. The deployment device 300 periodically sends an ICN interest packet with the above mentioned name via: (a) the interface connecting it to the ad-hoc network, in the cases in which the deployment device 300 is collocated in the dd-hoc network (e.g., installed in an edge device of the ad-hoc network); (b) a regular communication interface, having the interest packet encapsulated in an IP packet with the destination address of an edge device of the ad-hoc network.

When a service device 400 gets this interest packet, its performs the following actions: (a) if there are more faces leading to other ad-hoc network neighbors, it forwards the received interest packet over all those faces, with the exception of the face over which the interest packet was received; (b) otherwise, the service device terminates the interest packet and creates and sends a data packet with the locally stored requested data, which can encompass different items depending on the use case, such as: battery lifetime, available storage, number of nodes, average delay to neighbor nodes.

When a service device 400 gets a data packet with the name/adhoc-cloud/get-status it performs the following action: (a) adds to the data packet the locally stored status information; (b) send the data packet following the installed ICN forwarding strategy.

Task 2: Service Tree Definition

This task is employed by the deployment device 300 to build the needed service tree 600 based on the service map 500 provided by the service provider and the updated information collected by using the network monitoring task (task 1).

This task is triggered by the service retrieval task (task 5). When the deployment device 300 gets a request from a service device 400 to deploy a given service, identified by the service head, it executes the following steps: (a) looks for the service map 500 referring to the requested service (based on the information on the service head); (b) runs an internal algorithm (optimization or based on Artificial Intelligence) to build a service tree 600 based on: (b1) the execution time of the overall service; (b2) the execution time of each microservice; (b3) the delay between each service device within the ad-hoc network; (b4) the storage, computing and energy capacity of each service device in the ad-hoc network; and (b5) the service devices that are closer to the needed data sources.

As a result, a service tree 600 as illustrated in FIG. 9 is created.

Task 3: Service Deployment

During the network monitoring phase (task 1), the deployment device 300 creates an image of the ad-hoc network 100 topology, and during the service tree definition task (task 2) it decides which service device should install which microservices. By combining this information, the deployment device 300 creates an entry in a source routing table 700 as shown in FIG. 10, in order to support the transmission of each microservice 520, 530, 540 to the right service device 400.

Figure 10:
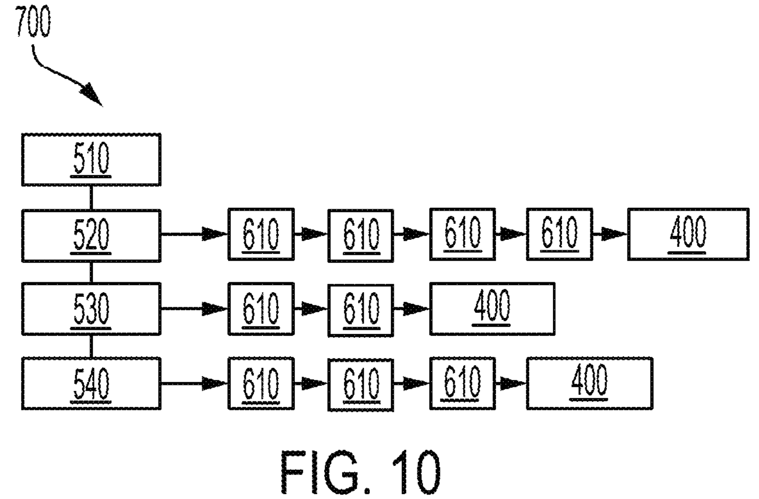
FIG. 10 is a schematic representation of a microservice routing table.

The transmission of microservices 520, 530, 540 is done based on a new packet type called deploy which carries the microservice 520, 530, 540 in the payload and the source routing chain of the respective microservice as shown in FIG. 10 in the packet header. The Named Service Networking (NSN) protocol stack of each service device 400, when it receives a deploy packet, reads the first element of the chain carried in the packet header, and places the deploy packet in the outgoing queue of the interface indicated by that element, after removing its identification from the packet header. This process continues until the destination address in the deploy packet header is reduced to one element, meaning that the microservice has arrived at the target service device and should be installed in the local service device.

FIG. 10 shows a source based routing table 700 for a service head 510 with the microservices 520, 530, 540. The source based routing table defines for each microservice the routing chain with multiple faces 610 to the respective service devices 400. As can be derived from FIG. 10, the routing chain of each microservice may include a different number of faces 610, depending on the distance to the distance (e.g., number of hops) through the network to the target service device 400.

Task 4: Service Lookup

This method is triggered when a customer requests the execution of an ad-hoc network service to the closest service device 400 via an IP/ICN proxy 440. After receiving a service request from a customer, the service device: (a) checks if the service head 510 of the requested service is found locally. if so, the service execution is triggered; (b) if the service head 510 is not found locally, the service device creates an interest packet with name: /adhoc-cloud/lookup/servicehead/executiontime/triggeringtime When a service device 400 receives such an interest packet, it performs a lookup in the local microservice repository 460. If the service head is found there, the execution of the service is triggered, if and only if the execution time of the locally found service plus the interest packet delay (current time measured locally minus the triggeringtime indicated in the interest packet) is lower than the executiontime carried in the interest packet. If the service execution is triggered, a data packet with the service result is forwarded back through the interest packet inverse path (as provided by the ICN pending interest table).

If the service head is not found locally, the interest packet is forwarded to all neighbors (following a multicast forwarding strategy provided by the ICN data plane). If the interest packet cannot be forwarded (no more neighbors), it is dropped and no data packet is generated.

If the service device that triggered the service lookup task does not receive any data packet within a stipulated timeout (e.g., equal to two times the service execution time), it concludes that the requested service is not deployed in the ad-hod network and it triggers the service retrieval task (task 5).

Task 5: Service Retrieval

This task is employed by a service device 400 aiming to retrieve the name of the service tree 600 of a new service from the deployment device 300. In this case, the following actions are performed: (a) the service device 400 creates an interest packet with the name prefix/adhoc-cloud/retrieve/servicehead; (b) the interest packet is forwarded based on the information provided by the ICN data plane, whose forwarding information base can already have a path to the source of that request (the deployment device) or a default ICN multicast forwarding service is used.

When the deployment device 300 receives such an interest packet, it will trigger the service tree definition task (task 2), after which the name of the resulting service tree is sent back in a data packet that follows the inverse path of the corresponding interest packet. Afterwards, the deployment device triggers the service deployment task (task 3) based on the created service tree.

When the service device that sent the interest packet/adhoc-cloud/retrieve/servicehead gets the resulting data packet, it uses the name of the service tree to trigger the service execution task (task 6).

Task 6: Service Execution

This task is employed by a service device 400 after receiving a request from the IP/ICN proxy 440 to execute a service whose service tree name is already stored locally, or as a result of the execution of the service retrieval task (task 5).

The service tree name has a format as indicated above, exemplified below. The name can describe service trees with several segments, as shown in the example with segments S11 and S12. The numbering of the segments refers to their correlation: S11 means the segment 1 of level 1, which is related with S12 that is segment 2 of level 1, while for instance S21 and S22 would refer to the segments 1 and 2 of level 2, which could be inside the segments S11 or S12.

Figure 11:
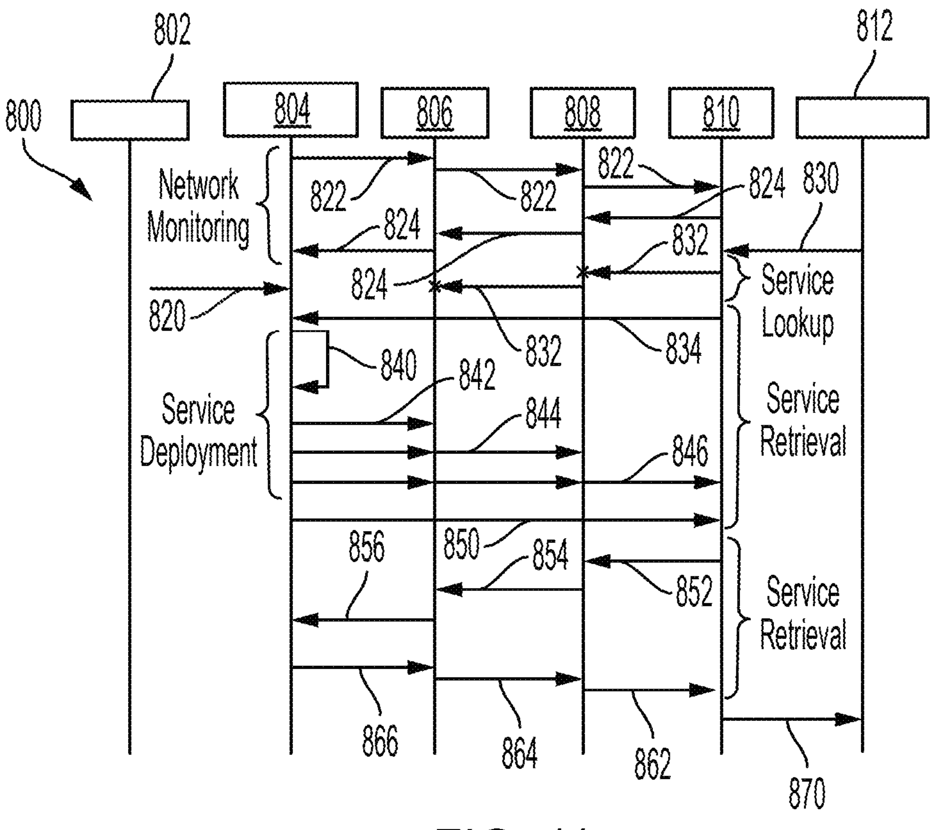
FIG. 11 is a schematic representation of the tasks performed for deployment and execution of a deployed service.

Example of service tree name: /multimedia/S11/face2/face10/videoanalysis/face30/face40/face50/videofiltering/face60/video-aircraft320/S12/face1/soundanalysis/face10/surroundingsound-factory The execution of the service requires the execution of all microservices as defined in the service tree. This means that the execution of a service requires the coordination of a chain of interest and data packet transmissions, which is done based on an approach as schematically illustrated in FIG. 11 and outlined below.

With the NSN transmission of interest packets, storing of any forwarding information base (FIB) state by service devices is not required, since all the information needed to forward interest packets is encoded in the service name carried by the interest packet. The transmission of the data packet follows the inverse path of the interest packets, as indicated in a Pending Interest Table (PIT).

In an NSN protocol stack, the name carried in the interest packet changes during the lifetime of the interest packet, namely when it crosses a service device that executes a microservice.

For instance, reception of an interest/videoanalysis/face30/videofiltering/face60/video-aircraft320 by a service device that implements the microservice/videoanalysis leads to the transmission of an interest packet with the name/videofiltering/face60/video-aircraft320.

Another example is the execution of a service requested by a user via a proxy, being the service identified by the name: multimedia/videoanalysis/videofiltefing/video-aircraft320//soundanalysis/surround ingsound-factory. The service device that receives this request has a local microservice/multimedia, as well as the information provided by the deployment device about the service tree. Based on the received request it is identified that the service device needs to have the following two types of data to execute the microservice/multimedia/videoanalysis/videofiltering/video-aircraft320/and/soundanalysis/surroundingsound-factory.

The next step is to check the local data store to see if the required data objects are locally available. If they are not available, the service device enters the name of the needed data in a Pending Service Table (PST) pointing to the local/multimedia microservice, which needs them to be executed.

Afterwards, the service device checks the next elements of the service tree to see what are the local faces to use to forward interest packets needed to gather the needed information. In this example, an interest packet with the name/face 10/videoanalysis/face30/videofiltering/face60/video-aircraft320 is forwarded via face 2 and an interest packet with the name/soundanalysis/face 10/surroundingsound-factory is forwarded via face 1.

Using the interest packet /face10/videoanalysis/face30/videofiltering/face60/video-aircraft320 as example, the next service device confirms that this interest packet should be forwarded via face 10. Hence the service device creates the needed PIT entry based on the name of the received interest packet after filtering all references to faces in the service name. After this, a new interest packet with the name/videoanalysis/face30/videofiltering/face60/video-aircraft320 is forwarded over Face10.

The next service device performs the regular NSN operations: (a) verify if the requested microservice/videoanalysis is locally active; (b) check if the data requested by that microservice,/videofiltering/video-aircraft320, is available in the data store; (c) if it is not available, a new entry is created in the PST to associate the needed data with the local/videoanalysis microservice, after which, (d) an interest packet is sent via the face indicated in the service name carried in the interest packet immediately after the name of the local microservice (face 30 in this case). The interest packet to be sent carries a name that is equal to the one carried in the received interest packet minus the name of the local microservice and face. In this case, the name is/videofiltering/face60/video-aircraft320.

This operation occurs in all service devices that have a local microservice installed but do not have the data needed for the execution of that microservice.

A different approach is applied in case the data requested in a received interest packet is locally available in the data store. In this case, a data packet is created with the locally available data and with the same name as the one carried by the received interest packet. This data packet is transmitted via all the faces indicated in the PIT.

When a service device receives a data packet, it performs the following operations: (a) store the received data in the local data store; (b) verify if some other neighbors need that data, by checking the PIT. If so, the data packet is forwarded via the face indicated in the PIT; (c) verify if some local microservices need the received data, by checking the PST, in which case the data carried in the packet is passed to the local microservice, and the data packet is terminated; (d) if a local microservice was activated, the result of the microservice execution is included in a data packet with the name of the microservice plus the name of all the used data objects. In this case, the name is/videoanalysis/videofiltering/video-aircraft320; (e) the resulting data packet is forwarded via all faces for which a corresponding entry exists in the PIT.

All these operations are repeated in different service agents until the one that has a face in the PIT towards a customer/consumer via an IP/ICN proxy.

FIG. 11 provides an overview of a service deployment and execution scheme 800, particularly showing the packet exchange between entities of the ad-hoc network in order to implement the tasks 1 to 6 indicated above.

A producer is generally shown at 802 and a consumer is generally shown at 812. The producer 802 and the consumer 812 interact with each other via a network of which a deployment device 804 (corresponding to the deployment device 300) and service devices 806, 808, 810 (corresponding to the service device 400) are shown. The deployment device 804 may be a SDN controller and the service devices 806, 808, 810 may be NSN agents.

At 820, a service map is provided by the producer 802 to the deployment device 804.

The deployment device 804 executes the network monitoring task by sending respective interest packets 822 (monitor) to the service devices 806, 808, 810. The service devices 806, 808, 810 respond with data packets 824 and thus provide network status information and device status information to the deployment device 804.

At 830, the consumer 812 sends a service request to the service device 810. This service request initiates the service lookup task. The service device 810 does not host the requested service and, therefore, it sends an interest packet 832 (service lookup) to the service device 808. The service device 808 does also not host the requested service and sends a corresponding interest packet 832 to the service device 806, which also does not host the requested service. As a result, the service device 810 sends an interest packet 834 (service retrieve) to the deployment device 804.

At 840, the deployment device 804 generates a service tree with three microservices MS1, MS2, MS3. The microservices MS1, MS2, MS3 are deployed to the service devices 806, 808, 810, as shown at 842 by using deploy messages. In the present example, the microservice MS1 is directly deployed to the service device 806, while the microservices MS2 and MS3 are firstly deployed to the service device 806 which recognizes that these microservices have to be forwarded to the service device 808, as shown at 844. The service device 808 receives and implements the microservice MS2 and forwards the microservice MS3 to the service device 810, as shown at 846.

At 850, a data packet (retrieve) for the microservices MS1, MS2, MS3 is sent by the deployment device 804 to the service device 810 to inform the service device 810 about deployment of the requested service.

Now, interest message (execute) 852 for executing the microservices MS1, MS2, MS3 is send to the service devices. MS1 is scheduled to be executed by service device 810 and the interest message 854 with the microservices MS2, MS3 is forwarded to the service device 808. The service device 808 schedules execution of MS2 and forwards the interest message 856 for executing MS3 to the service device 806.

Data packets with processed data from the microservices are sent in the opposite direction via the same route taken by the interest messages 852, 854, 856. Data packet 866 includes data from MS3, and is forwarded to the next service device in the chain to be used by MS2. Data packet 864 includes the output data of MS2 which may be generated based on the data from MS3. Data packet 862 includes the output data of MS1 which may be generated based on the data from MS2 (and MS3). At 870, the service reply is provided to the consumer 812.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above.

This disclosure is intended to cover any adaptations or variations of the exemplary embodiment(s). In addition, in this disclosure, the terms "comprise" or "comprising" do not exclude other elements or steps, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

80 communication link
90 cloud
100 ad-hoc network
102 service segment
110 device
115 edge device
120 service
130 microservice
200 end device
300 deployment device
310 producer interface
320 network interface
330 source based routing
340 information centric networking
350 controller
360 status data
370 service trees
380 service maps
400 service device
410 consumer interface
420 network interface
430 named service networking
440 proxy, ICN/IP proxy
450 data store
460 microservices repository
500 service map
510 service head
512 time frame, execution time
520 microservice
522 time frame, execution time
530 microservice
532 time frame, execution time
540 microservice
542 time frame, execution time
550 data
560 data
600 service tree
610 face
700 source routing table
800 service deployment and execution scheme
802 producer
804 deployment device
806 service device
808 service device
810 service device
812 consumer
820 service map
822 interest packet: network monitoring
824 data packet: network monitoring
830 service request
832 interest packet: service lookup
834 interest packet: service retrieve
840 generate service tree with MS1, MS2, MS3
842 deploy MS3
844 deploy MS2
846 deploy MS1
850 data retrieve for MS1, MS2, MS3
852 interest packet: execute MS1, MS2, MS3
854 interest packet: execute MS2, MS3
856 interest packet: execute MS3
862 data packet: execute MS1, MS2, MS3
864 data packet: execute MS2, MS3
862 data packet: execute MS3
870 service reply

The invention claimed is:

1. A deployment device for deploying a service composed of multiple microservices in an ad-hoc network with multiple devices which are communicatively connected to one another, the deployment device comprising:

a controller, configured to:

monitor a status of the ad-hoc network by collecting: a topology of the ad-hoc network, current resources of the multiple devices of the ad-hoc network, changing behavior of the ad-hoc network, a data transmission delay between a respective data source of a plurality of data sources and microservices that need data from the respective data source, and a relation between the microservices that compose a service;

create a service tree based on a service map and the status of the ad-hoc network, wherein the service tree defines a service that is composed of multiple microservices where each microservice is allocated based on the relation between the microservices, and wherein the service tree includes an assignment of each of the multiple microservices of a service to a service device of the ad-hoc network and includes a plurality of segments, defined by the microservice relations, linking the multiple microservices to their respective data sources;

create an entry in a source routing table to transmit one of the multiple microservices to the assigned service device;

generate a deploy packet for each of the multiple microservices, wherein each deploy packet carries a respective microservice in a payload of the deploy packet and a source routing chain indicating the routing chain of the deploy packet to the assigned service device in a header of the deploy packet, the source routing chain including, for each respective deploy packet, a number of faces derived based on a distance to the assigned service device; and deploy the deploy packet in the ad-hoc network.

2. The deployment device of claim 1, wherein the controller is configured to periodically repeat the monitoring of the status of the ad-hoc network.

3. The deployment device of claim 1, wherein the controller is configured to monitor a status of at least one of edge devices or mobile devices of the ad-hoc network.

4. The deployment device of claim 1, wherein the controller is configured to monitor the status of the ad-hoc network by using an Information Centric Networking data plane by periodically sending an interest packet via an interface connecting the deployment device to the ad-hoc network.

5. The deployment device of claim 1, wherein the controller is configured to receive a service request that indicates a service to be deployed;

fetch a service map based on the received service request;

create the service tree based on the fetched service map and a characteristic selected from a group consisting of:

an execution time of the service, or an execution time of each microservice of the service, or a transmission delay between service devices of the ad-hoc network for executing the microservices of the service, or resources including at least one of storage, computing capacity, or energy capacity of each service device of the ad-hoc network, or any combination thereof.

6. A network being the ad-hoc network according to claim 1, the network comprising:

multiple network devices that are communicatively connected to one another in accordance with a network topology;

the deployment device according to claim 1;

the service device for executing a microservice in the ad-hoc network, the service device being configured to:

receive a service request from an end device; and look up for an availability of the requested service and, when the requested service is available, provide the requested service to the end device, and, when the requested service is not available, request a service to be deployed by a deployment device and execute the service;

wherein each of the multiple network devices is configured to execute at least one microservice that belongs to a service to be provided to service consumers.

7. The ad-hoc network of claim 6, wherein each of the multiple network devices is a network node that establishes the network topology of the ad-hoc network.

8. The ad-hoc network of claim 6, wherein each of the multiple network devices is located on a stationary entity or on a mobile entity; and wherein the multiple network devices are interconnected by direct links between two network devices, respectively.

9. The deployment device of claim 1, wherein the allocation of each microservice based on the relation between the microservices is derived from a threshold for execution of the service and one or more connecting faces linking each microservice to the respective data source.

10. The deployment device of claim 9, wherein the threshold is selected from a list consisting of:

a first time frame represented by the data transmission delay between the respective data source of a plurality of data sources and microservices that need data from the respective data source; or a second time frame for executing the service once the data has been retrieved from the respective data source; or an aggregation of the first time frame and the second time frame.

* * * * *